(12) United States Patent
Kimmich et al.

(10) Patent No.: US 7,905,394 B2
(45) Date of Patent: Mar. 15, 2011

(54) ASSEMBLY COMPRISING A TACHOGRAPH

(75) Inventors: Franz Kimmich, Schramberg (DE);
Andreas Lindinger, Flözlingen (DE);
Horst Näther, Villingen-Schwenningen (DE); Michael Salm, Peterzell (DE)

(73) Assignee: Continental Automotive GmbH, Hannover (DE)

( * ) Notice: Subject to any disclaimer, the term of this patent is extended or adjusted under 35 U.S.C. 154(b) by 55 days.

(21) Appl. No.: 12/066,328

(22) PCT Filed: Aug. 30, 2006

(86) PCT No.: PCT/EP2006/065829
§ 371 (c)(1),
(2), (4) Date: Mar. 11, 2008

(87) PCT Pub. No.: WO2007/031406
PCT Pub. Date: Mar. 22, 2007

(65) Prior Publication Data
US 2008/0251577 A1   Oct. 16, 2008

(30) Foreign Application Priority Data
Sep. 12, 2005   (DE) .......................... 10 2005 043 335

(51) Int. Cl.
*G06K 7/10* (2006.01)
(52) U.S. Cl. ...................................... 235/377
(58) Field of Classification Search .................. 235/377, 235/376, 384; 701/34, 114, 115; 711/101, 711/109, 110, 113, 115, 118, 136, 144, 161, 711/162
See application file for complete search history.

(56) References Cited

U.S. PATENT DOCUMENTS 4,651,307 A * 3/1987 Toumayan et al. ............... 714/6
4,654,819 A * 3/1987 Stiffler et al. ................. 711/162

(Continued)

FOREIGN PATENT DOCUMENTS

| DE | 19502657 | 8/1996 |
|---|---|---|
| DE | 10064469 | 6/2002 |
| DE | 10210320 | 11/2002 |
| DE | 103 21 252 A1 | 12/2004 |
| EP | 0762339 | 3/1997 |
| EP | 0917110 | 5/1999 |
| GB | 2 271 180 A | 4/1994 |

OTHER PUBLICATIONS

Council Regulation (EEC) No. 3821/85 of Dec. 20, 1985 on recording equipment in road transport, (OJ L 370, Dec. 31, 1985), 270 pages.

*Primary Examiner* — Seung H Lee
(74) *Attorney, Agent, or Firm* — King & Spalding L.L.P.

(57) ABSTRACT

An assembly has a tachograph and a data memory, in particular a data memory of a data card. The tachograph has an interface designed to exchange data between the tachograph and the data memory, logic function modules and at least one memory. In a method for operating the tachograph, as a result of high security requirements, the data transfer between the data memory and the tachograph is extremely time-intensive. At the start of the data transfer a virtual reproduction of the data memory is created in the memory of the tachograph and the logic function modules first have read and write access to the virtual reproduction in the memory. Data is then regularly written to the data memory of the data card by a write access to the memory, thus eliminating the differences between the virtual reproduction and the data memory.

20 Claims, 3 Drawing Sheets

U.S. PATENT DOCUMENTS

| | | | |
|---|---|---|---|
| 4,939,652 A * | 7/1990 | Steiner | 701/35 |
| 5,581,464 A * | 12/1996 | Woll et al. | 701/35 |
| 5,848,076 A * | 12/1998 | Yoshimura | 714/763 |
| 6,744,377 B1 * | 6/2004 | Inoue | 340/928 |
| 7,356,389 B2 * | 4/2008 | Holst et al. | 701/3 |
| 2002/0027499 A1 * | 3/2002 | Chainer et al. | 340/426 |
| 2005/0004926 A1 * | 1/2005 | Ohtani | 707/100 |
| 2007/0034698 A1 | 2/2007 | Hautvast et al. | 235/486 |

* cited by examiner

ASSEMBLY COMPRISING A TACHOGRAPH

CROSS-REFERENCE TO RELATED APPLICATIONS

This application is a U.S. national stage application of International Application No. PCT/EP 2006/065829 filed Aug. 30, 2006, which designates the United States of America, and claims priority to German application number 10 2005 043 335.9 filed Sep. 12, 2005, the contents of which are hereby incorporated by reference in their entirety.

TECHNICAL FIELD

The invention relates to an arrangement having a tachograph and having a data store, particularly a data store on a data card, where the tachograph has an interface which is used for data interchange between the tachograph and the data store, which tachograph has logic functional modules and at least one memory.

BACKGROUND

In line with EC regulation No 3821/85, in future the tachographs used in commercial vehicles to record operating data will no longer, as conventionally, use analogue means to write on a paper tachograph disk but rather will store the speed over time digitally in a data store, namely a data store on a data card. The EC regulation contains extensive details as to how the data to be recorded, which need to meet the requirements for legal evidence, inter alia, are to be stored and to be protected against manipulation. To meet the stringent requirements of the regulation, very complex cryptological protection mechanisms and authentication processes need to be implemented. Particular focus in this context is on allowing the transmission of data between the data store on the data card and the tachograph. A data card holding apparatus is already the subject matter of German laid-open specification DE 103 21 252 A1, which describes an antimanipulation holder for a card in a tachograph as described above. Particularly the transmission of data between the data store on the data card and a memory in the tachograph needs to be protected against manipulation, since experience shows that such attacks are to be feared in this area. For this reason, pertinent tachographs and data cards respectively provide an encryption unit as an integral component which is used to transmit data in cryptologically protected form exclusively using a session key. This protection is extremely complex, however, and requires a lot of patience from the user, since access times are extended almost intolerably on account of the protection of the data transmission between the tachograph and the data card. In line with ISO 7816, the read/write access to the data store on the data card is furthermore limited to a length of 256 bytes, which means that the communication via the serial connection used at this location takes place very slowly on the basis of the EC regulation.

SUMMARY

To shorten access times when dealing with the tachograph without losses of security, or particularly in respect of the communication between the tachographs and the data card, according to an embodiment, the tachograph has an interface which is used for data interchange between the tachograph and the data store, wherein the tachograph has logic functional modules and at least one memory and the logic functional modules are operable to create at the start of the data transmission a virtual map of the data store in the memory of the tachograph, to effect subsequently read and write access operations by the logic functional modules on the virtual map in the memory, and to effect a write operation regularly by accessing the data store on the data card, during which the differences between the virtual map and the data store are aligned, wherein the regular read and write access is effected at periodic intervals of time and/or when a particular volume of data needs to be aligned between the virtual map and the data store on the basis of changes in the map.

According to a further embodiment, the regular read and write access may be effected every 12 hours. According to a further embodiment, before the data store is separated from the tachograph the virtual map may be aligned with the data store. According to a further embodiment, the data transmission between the data store and the tachograph may take place in encrypted form. According to a further embodiment, the data store may have a ring memory. According to a further embodiment, the map of the ring memory may be in the form of a linear memory, with a start address for the first entry and an end address for the last entry, where a stipulated addressing order provides for the call to the end address to be followed by the call to the start address. According to a further embodiment, the virtual map of the data store may map the architecture of the data store, and the data stored in the ring memory may be mapped in the map only in part. According to a further embodiment, the virtual map, following initial production, maps only the data from the last entry block in the ring memory of the data store. According to a further embodiment, the virtual map has at least one associated change pointer, namely the data store of the tachograph stores the location of the virtual map of the ring memory at which the first change since the last alignment was made. According to a further embodiment, a write operation in the virtual map extending from the end address to the start address of the map involves at least one first change pointer marking the location in front of the end address at which the changes after the last alignment have started and at least one second change pointer marks the location at which the write operation was continued after the end address. According to a further embodiment, the change pointers additionally also may comprise information about the number of bytes which have been stored in the ring memory starting from the indicated location since the last alignment. According to a further embodiment, single instances of the logic functional module effect read or write access operations on the map and in this context may be coordinated by means of a central status variable. According to a further embodiment, single instances of the logic functional modules may effect write access operations on memory areas of the map and in this context are coordinated by means of a central status variable, the functional modules regularly requesting the status variable and, when the status variable has a particular value which is associated with the respective requesting functional module, initiating queuing write operations. According to a further embodiment, the logic functional modules which effect the write access operations on a memory area of the map change the status variable following the conclusion of the queuing write access operations. According to a further embodiment, the logic functional modules may comprise a map status module which regularly retrieves the status variable and allocates it a new value if another functional module has previously changed the value, which new value is associated with a particular functional module for the purpose of allocating the write access. According to a further embodiment, the arrangement may comprise an electrical power supply and may be in a form such that, when the latter has failed, any other access to the data store is first of all preceded by identification data from the data store being compared with those from the virtual map of the data store. According to a further embodiment, the arrangement is in a form such that, in the event of a power failure, directly before entering a read or write operation from or to the data store, when the power has returned, it first of all compares identification data from the data store with those from the virtual map of the data store and then starts the read or write operation. According to a further embodiment, in the event of a power failure during a read operation from the data store the functional modules remain in the present state until the power returns and then continue the read operation from this state after identification data from the data store have first of all been compared with those from the virtual map of the data store. According to a further embodiment, in the event of a power failure directly following the conclusion of a read or write operation from or to the data store, when the power has returned, identification data from the data store are first of all compared with those from the virtual map of the data store. According to a further embodiment, According to another embodiment, a method for operating an arrangement comprising a tachograph and having a data store on a data card, may comprise the steps of: creating at the start of a data transmission between the tachograph and the data store a virtual map of the data store in the memory of the tachograph, and performing subsequently read and write access operations on the virtual map in the memory, wherein a write operation is regularly performed by accessing the data store on the data card, during which the differences between the virtual map and the data store are aligned, and wherein the regular read and write access is performed at periodic intervals of time and/or when a particular volume of data needs to be aligned between the virtual map and the data store on the basis of changes in the map.

BRIEF DESCRIPTION OF THE DRAWINGS

The invention is described in more detail below with reference to a specific exemplary embodiment without any restrictive action for the purposes of clarification. In the drawing.

DETAILED DESCRIPTION

Figure 1:
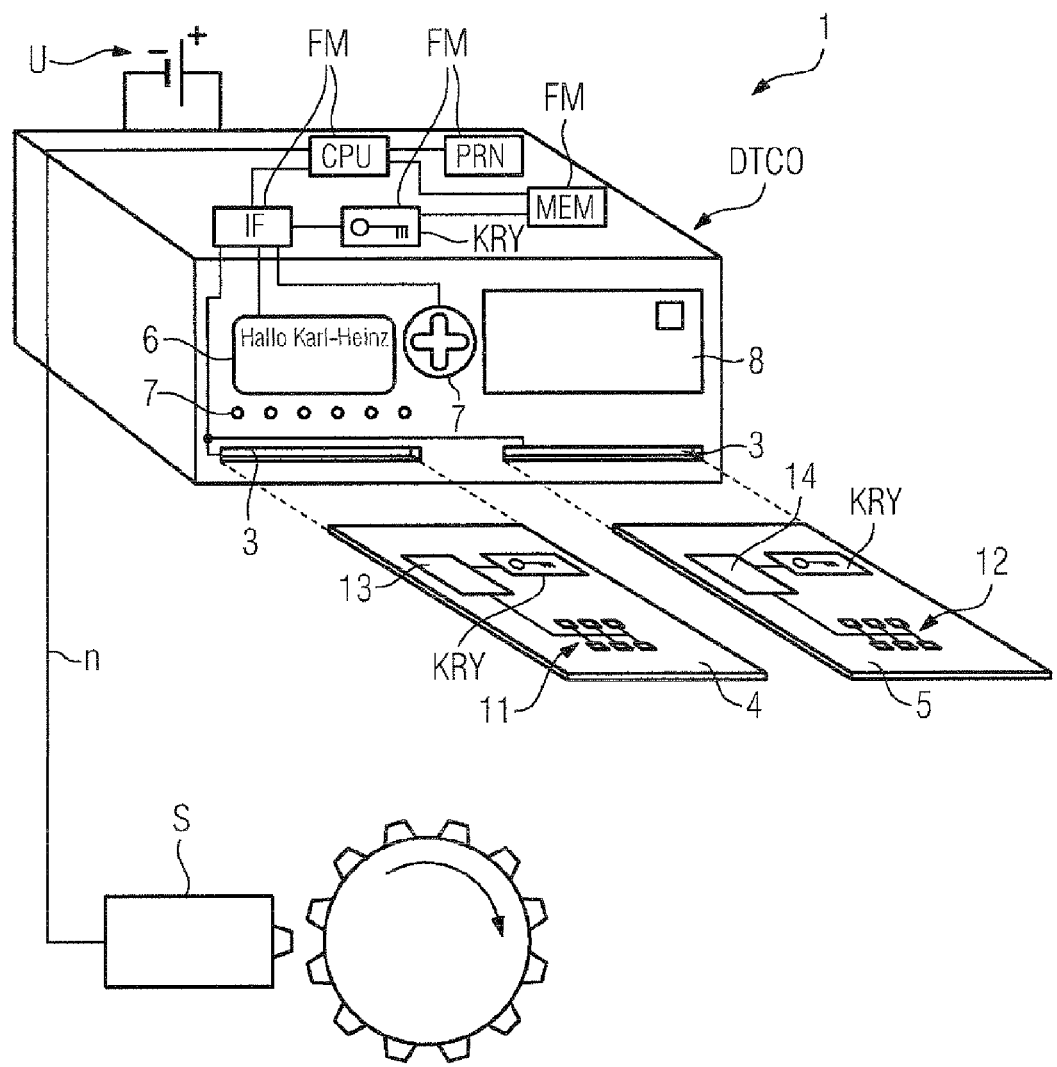
FIG. 1 shows a schematic illustration of an arrangement according to an embodiment.

It is proposed, according to an embodiment, that the logic functional modules be in a form such that at the start of the data transmission a virtual map of the data store is first of all created in the memory of the tachograph, subsequent read and write access operations by the logic functional modules are first of all effected on the virtual map in the memory, and a write operation is regularly effected by accessing the data store on the data card, during which the differences between the virtual map and the data store are aligned.

One particular advantage according to various embodiments is the saving of a large number of data transmission cycles between the tachograph and the data store or the data card. Since pertinent tachographs regularly have two holding apparatuses for two data cards, the saving of this complexity has almost double the effect. Since the regularly interrupt-controlled recording signals from the speed sensor, which queue up at a high frequncy, mean that the tachograph's processing unit utilizes the central processing unit to a relatively high degree during operation, the load relief according to various embodiments is a great advantage. Regular alignment can take place comparatively rarely, for example at intervals of 12 hours in each case. In the event of a request to remove the data card from the tachograph or when the data store is separated from the tachograph, alignment is necessary between the virtual map in the memory and the data store on the data card. The request for removal is regularly made when the commercial vehicle is at a standstill, however, which means that the high-frequncy speed signal is not queuing and the central processing unit is relieved of load anyway. This allows acceptable access times to be implemented despite the necessary alignment when the data store is separated from the tachograph.

As an alternative or in addition to regular read and write access to the data store, particularly the data card, by the tachograph at periodic intervals of time, preferably every 12 hours, such data interchange can also take place when a particular volume of data needs to be aligned between the virtual map and the data store on the basis of changes in the map. A minimum standard which would nevertheless satisfy pertinent security provisions is the option of aligning the virtual map with the data store before the data store is separated from the tachograph. Advantageously, the tachograph is in a form such that the data card is held completely by the tachograph's data card holding apparatus and cannot be removed from the appliance directly, but rather the user communicates a removal request to the appliance by pushing a button, whereupon the data card is ejected from the tachograph following an appropriate interchange of data. Although a modern tachograph is regularly already provided with all the security mechanisms possible from a mechanical point of view which protect the data transmission between the data store and the tachograph against manipulation, the data transmission between the data store and the tachograph regularly takes place in encrypted form. The data store is used to record particularly the speed data from the commercial vehicle and the activities of the vehicle driver. In this regard, the available storage space on the data card is relatively limited, which means that a portion of the data store is expediently in the form of a ring memory and in this way the oldest recordings are always overwritten with the most recent. Taking this into account, the map of the ring memory may advantageously be in the form of a linear memory, with a start address for the first entry and an end address for the last entry, where a stipulated addressing order provides for the call to the end address to be followed by the call to the start address. In this context, it is expedient if, although the virtual map of the data store maps the architecture of the data store, the data stored in the ring memory are mapped in the map only in part. Full transmission of the entire content of the data store, for example when the card is inserted into the tachograph, sometimes takes an unacceptably long time, the old data not necessarily having any corresponding practical benefit in this context. It therefore makes sense if the virtual map, following initial production, first of all maps only the data from the last entry block in the ring memory of the data store.

To avoid excess complexity for the data transmission, it makes sense if the virtual map has at least one associated change pointer, namely the data store of the tachograph stores the location of the virtual map of the ring memory at which the first change since the last alignment was made.

According to a further embodiment, a write operation in the virtual map extending from the end address to the start address of the map involves at least one change pointer marking the location in front of the end address at which the changes after the last alignment have started and at least one second change pointer marks the location at which the write operation was continued after the end address. Such marking over the address jump in the ring memory ensures conflictless alignment between the data store and the memory of the tachograph. The reliability of this operation can be additionally increased if the change pointers additionally also comprise information about the number of bytes which have been stored in the ring memory starting from the indicated location since the last alignment.

A lot of time may be lost when various logic functional modules effect read or write access to the map and fixed time windows have been prescribed for this. Although such operations may also be carried out under interrupt control, this destabilizes operations in the central processing unit.

It is therefore particularly expedient to coordinate the logic functional modules effecting read or write access to the map using a central status variable. In this context, it makes sense if the functional modules regularly request the status variable and, when the status variable has a particular value which is associated with the respective requesting functional module, initiate queuing write operations. As a ready message, so to speak, provision may be made for the logic functional modules which carry out the write access operations on the memory area of the map to change the status variable following the conclusion of the queuing tasks. Conflictless coordination of these access operations on the data store is assured particularly if the logic functional modules comprise a map status module which regularly retrieves the status variable and allocates it a new value if another functional module has previously changed the value, which new value is associated with a particular functional module for the purpose of allocating the write access.

The various embodiments provide particular runtime advantages if the functional modules comprise an encryption unit which is used to encrypt elements of the data transmission between the tachograph and the data store. To this end, the data store may likewise have an encryption unit.

On the basis of the special marking, according to various embodiments, of the data from the virtual map which are to be aligned, there can be provides further advantages when the electrical power supply fails. In this case, the arrangement may provide that when the power supply has failed, any other access to the data store is first of all preceded by identification data from the data store being compared with those from the virtual map of the data store. This configuration makes sense because, when the supply voltage is cut off, an attempt at manipulation may possibly provide for the data store to be replaced. The advantage of the various embodiments at this junction is particularly that the virtual map of the data store, including the identification data, is already available and hence merely a comparison is necessary. If a power failure occurs directly before a data transmission commences, or directly after such a data transmission concludes, it is thus necessary merely to authenticate the data store when the power has returned. According to a further embodiment, a power failure during a read operation from the data store expediently may have the effect that the functional modules remain in the present state until the power returns and then continue the read operation from this state after identification data have first of all been compared with one another, preferably reciprocally.

Unless express mention has been made, the functional features always relate to a form of the arrangement according to which the claimed function can be performed using the arrangement. Besides the arrangement, the subject matter of the invention is also directed to a method for operating an arrangement.

FIG. 1 shows an arrangement 1 according to an embodiment having a tachograph DTCO which is connected to a sensor S providing a speed signal n and has data card holders 3 into which data cards 4, 5 can be inserted. The tachograph DTCO has various logic functional modules FM which comprise, inter alia, a central processing unit CPU, an interface management module IF, an encryption module KRY, a memory MEM and a printer controller PRN. In addition, the tachograph DTCO also has a display unit 6, various operator control elements 7, a power supply U and a print module 8. The individual functional modules FM are connected to one another so as to transmit signals. The data cards 4, 5 respectively have an interface 11, 12 which can connect to an interface (not shown in more detail) of the tachograph DTCO for the purpose of data transmission. The data cards 4, 5 can use this interface 11, 12 to transmit respective information stored in a data store 13, 14 on the data card 4, 5 to the tachograph 2, with encryption modules KRY both in the data cards 4, 5 and in the tachograph DTCO ensuring cryptologically protected transmission.

Figure 2:
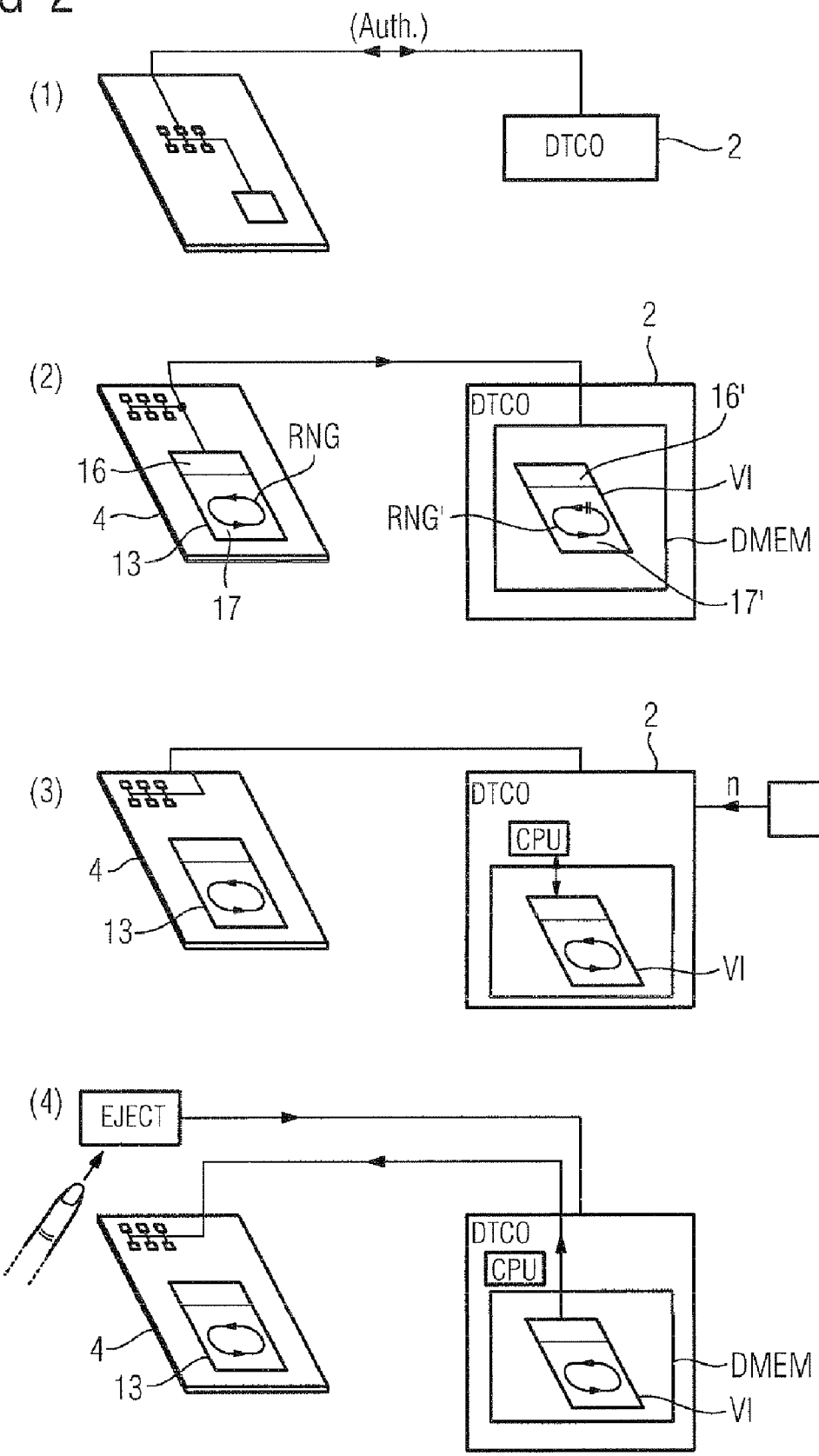
FIG. 2 shows a schematic illustration of the flow of the fundamental processes during operation of an arrangement according to an embodiment.

FIG. 2 shows the schematic flow of the production of a virtual map VI in a memory DMEM of the tachograph DTCO on the basis of the data store 13 on the data card 4. In FIG. 2, the reference symbols for the elements which correspond to those of the actual data store 13 have been provided with a small dash. In a first step (1), the tachograph DTCO and the data store 13 on the data card 4 connect to one another for the purpose of signal transmission, and an authentication operation (Auth.) is automatically initiated between these two participants in the communication. Following successful authentication (Auth.), the tachograph DTCO creates a virtual map VI in its memory DMEM from the data store 13 on the data card 4. This involves the total structure of the data store being mapped in the virtual map VI. This comprises a first memory portion 16, 16' of the usual nature and a second memory portion 17, 17', which is in the form of a ring memory RNG, RNG'. Following production of the virtual map VI in the memory DMEM of the tachograph DTCO, the recording mode of the tachograph 2 essentially takes place in step (3), during which the speed signal n is recorded in the virtual map VI. Every 12 hours, the virtual map VI is aligned (not shown) with the data store 13 on the data card 4. This alignment essentially involves the entries in the ring memory RNG being aligned with one another. In the event of a removal request (EJECT) on the digital tachograph DTCO, as shown in step (4), the virtual map VI is first of all aligned with the data store 13 and then the data card 4 is ejected.

Figure 3:
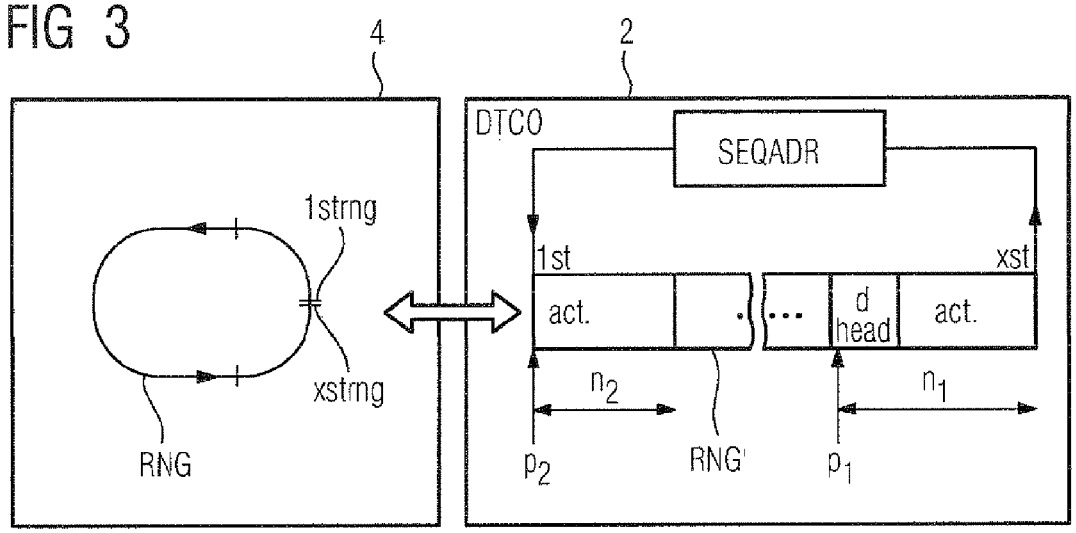
FIG. 3 shows a schematic illustration of the implementation of a ring memory from a virtual depiction according to an embodiment.

FIG. 3 shows the alignment of the virtual map VI, particularly the ring memory RNG', with the data store 13 or its ring memory RNG. A crucial factor in this context is the structure of the ring memory RNG in the virtual map VI, which has an actually linear structure, with a prescribed addressing order SEQADR allowing addressing of the last memory location Xst in this linear memory to be followed by the addressing of a first memory location 1st. In the ring memory RNG of the data card, this corresponds to the memory locations 1strng and Xstrng.

The ring memory RNG' of the tachograph DTCO or of the memory DMEM has change pointers p1, p2 which are used to mark the changes which have been made following the last alignment of the virtual map with the data store 13. In this context, the start of the changed entry is registered using the pointer denoted by p1, the situation shown in FIG. 3 showing an entry which is denoted by d head and act., which extends via the end address Xst and the start address 1st of the virtual map VI, and besides the first change pointer p1, a second change pointer p2 also marks the location at which the write operation was continued after the end address Xst, namely at the start address 1st. The entry comprises a header and the stored types of operation by the vehicle driver act. The change pointers p1, p2 respectively also have appended information in n1, n2 about the number of bytes which have been stored since the last alignment in the ring memory starting from the indicated location. Accordingly, the respective start point for the data to be aligned and the length are indicated by means of the change pointer.

Figure 4:
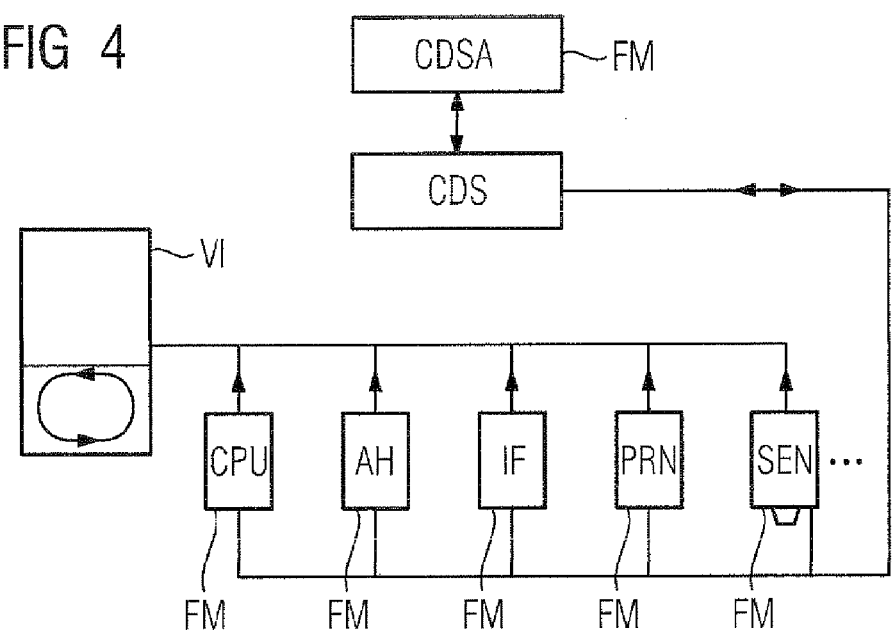
FIG. 4 shows a schematic illustration of the cooperation of logic functional modules with the memory, coordinated by means of a status variable according to an embodiment.

FIG. 4 schematically shows the coordination of the functional modules FM when writing to the virtual map VI using a card data status CDS. Various functional modules FM, for example the central processing unit CPU, an active hardware protection element AH, an interface manager IF, a print module PRN or a sensor Sen, write to the memory DMEM or its virtual map VI largely autonomously. So that no conflicts arise in this context, a central status variable CDS is provided which is assigned a value reciprocally by the functional modules FM and a map status module CDSA. In this case, the map status module CDSA assigns the status variable CDS a respective value which is associated with a functional module FM. The functional modules FM regularly request the value of the status variable CDS and initiate queuing write operations on the map VI if the value corresponds to the value which is associated with the relevant functional module. Following conclusion of the write operation, the functional module assigns the status variable CDS a new value which indicates conclusion of the write operation to the map status module, so that the status variable CDS can be assigned a new value.

What is claimed is:

1. An arrangement comprising a tachograph and having a data store on a data card, wherein the tachograph has an interface which is used for data interchange between the tachograph and the data store, which tachograph has logic functional modules and at least one memory and the logic functional modules are operable
   to create at the start of the data transmission a virtual map of the data store in the memory of the tachograph wherein the virtual map provides a one-to-one correspondence between data elements in the virtual map and data elements in the data store,
   to effect subsequently read and write access operations by the logic functional modules on the virtual map in the memory, and
   to effect a write operation regularly by accessing the data store on the data card, during which the differences between the virtual map and the data store are aligned, wherein the regular read and write access is effected (a) at periodic intervals of time or (b) when a particular volume of data needs to be aligned between the virtual map and the data store on the basis of changes in the map, or both (a) and (b).

2. The arrangement according to claim 1, wherein the regular read and write access is effected every 12 hours.

3. The arrangement according to claim 1, wherein before the data store is separated from the tachograph the virtual map is aligned with the data store.

4. The arrangement according to claim 1, wherein the data transmission between the data store and the tachograph takes place in encrypted form.

5. The arrangement according to claim 1, wherein the data store has a ring memory.

6. The arrangement according to claim 5, wherein the map of the ring memory is in the form of a linear memory, with a start address for the first entry and an end address for the last entry, wherein a stipulated addressing order provides for the call to the end address to be followed by the call to the start address.

7. The arrangement according to claim 5, wherein the virtual map of the data store maps the architecture of the data store, and the data stored in the ring memory are mapped in the map only in part.

8. The arrangement according to claim 5, wherein the virtual map, following initial production, initially maps only the data from the last entry block in the ring memory of the data store.

9. The arrangement according to claim 5, wherein the virtual map has at least one associated change pointer, namely the data store of the tachograph stores the location of the virtual map of the ring memory at which the first change since the last alignment was made.

10. The arrangement according to claim 9, wherein a write operation in the virtual map extending from the end address to the start address of the map involves at least one first change pointer marking the location in front of the end address at which the changes after the last alignment have started and at least one second change pointer marks the location at which the write operation was continued after the end address.

11. The arrangement according to claim 9, wherein the change pointers additionally also comprise information about the number of bytes which have been stored in the ring memory starting from the indicated location since the last alignment.

12. The arrangement according to claim 1, wherein single instances of the logic functional module effect read or write access operations on the map and in this context are coordinated by means of a central status variable.

13. The arrangement according to claim 1, wherein single instances of the logic functional modules effect write access operations on memory areas of the map and in this context are coordinated by means of a central status variable, the functional modules regularly requesting the status variable and, when the status variable has a particular value which is associated with the respective requesting functional module, initiating queuing write operations.

14. The arrangement according to claim 1, wherein the logic functional modules which effect the write access operations on a memory area of the map change a status variable following the conclusion of the queuing write access operations.

15. The arrangement according to claim 1, wherein the logic functional modules comprise a map status module which regularly retrieves the status variable and allocates it a new value if another functional module has previously changed the value, which new value is associated with a particular functional module for the purpose of allocating the write access.

16. The arrangement according to claim 1, wherein the arrangement comprises an electrical power supply and is in a form such that, when the latter has failed, any other access to the data store is initially preceded by identification data from the data store being compared with those from the virtual map of the data store.

17. The arrangement according to claim 1, being operable such that, in the event of a power failure, directly before entering a read or write operation from or to the data store, when the power has returned, it first of all compares identification data from the data store with those from the virtual map of the data store and then starts the read or write operation.

18. The arrangement according to claim 1, wherein in the event of a power failure during a read operation from the data store the functional modules remain in the present state until the power returns and then continue the read operation from this state after identification data from the data store have first of all been compared with those from the virtual map of the data store.

19. The arrangement according to claim 1, wherein in the event of a power failure directly following the conclusion of a read or write operation from or to the data store, when the power has returned, identification data from the data store are first of all compared with those from the virtual map of the data store.

20. A method for operating an arrangement comprising a tachograph and having a data store on a data card, the method comprising the steps of:

creating at the start of a data transmission between the tachograph and the data store a virtual map of the data store in the memory of the tachograph wherein the virtual map provides a one-to-one correspondence between data elements in the virtual map and data elements in the data store, performing subsequently read and write access operations on the virtual map in the memory, wherein a write operation is regularly performed by accessing the data store on the data card, during which the differences between the virtual map and the data store are aligned, and wherein the regular read and write access is performed (a) at periodic intervals of time or (b) when a particular volume of data needs to be aligned between the virtual map and the data store on the basis of changes in the map, or both (a) and (b).

* * * * *